United States Patent
Moroni

(10) Patent No.: US 11,840,308 B2
(45) Date of Patent: Dec. 12, 2023

(54) HYDROPNEUMATIC SYSTEM FOR CONTROLLING THE TILTING OF TWO WHEELS OF A VEHICLE AND A VEHICLE EQUIPPED WITH SAID SYSTEM

(71) Applicant: QOODER S.A., Vacallo (CH)

(72) Inventor: Marco Moroni, Gorla Minore (IT)

(73) Assignee: QOODER S.A., Vacallo (CH)

(\*) Notice: Subject to any disclaimer, the term of this patent is extended or adjusted under 35 U.S.C. 154(b) by 0 days.

(21) Appl. No.: 17/425,554

(22) PCT Filed: Jan. 29, 2020

(86) PCT No.: PCT/IB2020/050669
§ 371 (c)(1),
(2) Date: Jul. 23, 2021

(87) PCT Pub. No.: WO2020/157664
PCT Pub. Date: Aug. 6, 2020

(65) Prior Publication Data
US 2022/0135167 A1    May 5, 2022

(30) Foreign Application Priority Data
Jan. 29, 2019   (IT) .................. 102019000001247

(51) Int. Cl.
*B62K 5/10*    (2013.01)
*B62K 5/01*    (2013.01)
(Continued)

(52) U.S. Cl.
CPC .............. *B62K 5/10* (2013.01); *B62K 5/00* (2013.01); *B62K 5/027* (2013.01)

(58) Field of Classification Search
CPC . B62K 5/10; B62K 5/01; B62K 5/027; B60G 21/073; B60G 21/06; B60G 17/033; B60G 17/0432
See application file for complete search history.

(56) References Cited

U.S. PATENT DOCUMENTS 7,568,541 B2   8/2009   Pfeil et al.
7,802,800 B2   9/2010   Melcher

FOREIGN PATENT DOCUMENTS

DE   102006049793 A1   4/2008
EP      1702771 A2     9/2006
(Continued)

OTHER PUBLICATIONS

International Search Report and Written Opinion for International Patent Application No. PCT/IB2020/050669, dated Apr. 22, 2020, 12 pages.

*Primary Examiner* — Paul N Dickson
*Assistant Examiner* — Matthew Joseph Ganci
(74) *Attorney, Agent, or Firm* — Armstrong Teasdale LLP

(57) ABSTRACT

A system for controlling tilting of two wheels of a vehicle, mechanically anchored to the chassis by a first and a second oscillating anchor arm is provided. The system has a first cylinder and a second cylinder suitable for being interposed between the chassis and the first and second oscillating anchor arms respectively. The first and second cylinders have respectively a first chamber and a second chamber with variable volume and containing a working fluid. Transfer of working fluid from the first to the second chamber results in an increase in the volume of the second chamber. Transfer of working fluid from the second to the first chamber results in an increase in the volume of the first chamber. A pipe connects the first and second chambers so that working fluid is alternately transferable from the first to the second chamber and from the second to the first chamber.

14 Claims, 7 Drawing Sheets

(51) Int. Cl.
*B62K 5/027* (2013.01)
*B62K 5/00* (2013.01)

(56) References Cited

FOREIGN PATENT DOCUMENTS

| | | |
|---|---|---|
| EP | 2046589 B1 | 4/2010 |
| EP | 2729351 A1 | 5/2014 |
| EP | 3015296 A2 | 5/2016 |
| FR | 3058093 A1 | 5/2018 |
| JP | 2006131182 A | 5/2006 |
| NL | 8103202 A | 2/1983 |
| WO | WO-2017157976 A1 * | 9/2017 ............. B60G 11/30 |

* cited by examiner

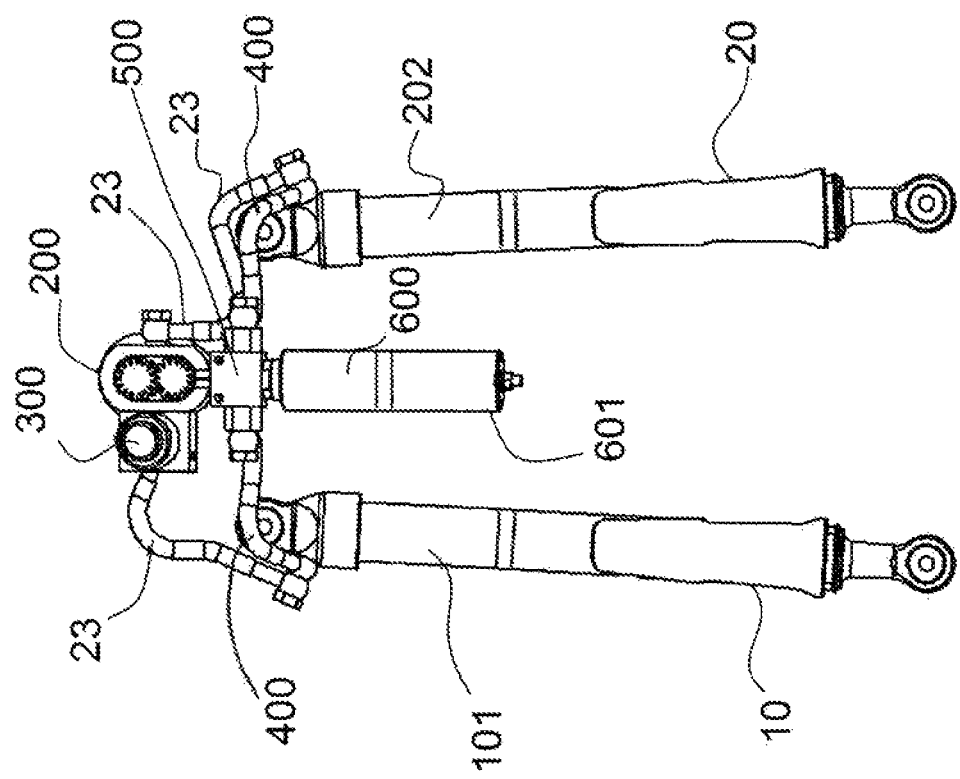

HYDROPNEUMATIC SYSTEM FOR CONTROLLING THE TILTING OF TWO WHEELS OF A VEHICLE AND A VEHICLE EQUIPPED WITH SAID SYSTEM

CROSS-REFERENCE TO RELATED APPLICATIONS

This application is a National Stage Application of International Patent Application No. PCT/IB2020/050669, having an International Filing Date of Jan. 29, 2020, which claims the benefit of priority to Italian Patent Application No. 102019000001247, filed Jan. 29, 2019, the entire contents of which are hereby incorporated by reference herein.

FIELD OF THE INVENTION

The present invention relates to vehicles with tilting wheels. In particular, the present invention relates to motorcycles with at least two tilting wheels positioned on the same horizontal axis. More in detail, the present invention relates to a device and/or a system suitable for improving tilting performance in vehicles and in particular motorcycles of the aforementioned type. Even more specifically, the present invention relates to a device and/or a system for an intelligent control of the tilting of at least two wheels in vehicles and/or motorcycles of the aforementioned type. Finally, the present invention relates to a vehicle, in particular a motorcycle, with at least two tilting wheels equipped with a device or system of the aforesaid type.

BACKGROUND OF THE INVENTION

Vehicles with tilting wheel are known in the art and are now widely diffused and appreciated by users. The expression "tilting wheel vehicles" means vehicles, in particular motorcycles, scooters, quads or the like, equipped with at least one pair of tilting wheels, for example motorcycles with at least two front tilting wheels and a (generally) non-tilting rear wheel. Vehicles with two rear swinging wheels also fall within the definition, as well as four-wheeled vehicles with at least one pair of tilting wheels.

The main feature of tilting wheel vehicles is that the (at least two) tilting wheels are able to tilt sideways thanks to the presence of a so-called tilting system of the wheels coupled on the same axis (in general, but as said not exclusively, the front wheels).

Tilting-wheel vehicles (hereinafter also referred to as "tilting vehicles"), are generally equipped with a tilting locking device that can be activated by the driver according to needs and/or circumstances.

In particular, devices and/or systems are known wherein the tilting block can be activated by the driver, by means of a switch, at speeds below a threshold established by the vehicle specifications (and therefore by the manufacturer), generally equal to a few Km per hour, where the tilting lock automatically disengages when the driver first opens the accelerator.

The tilting blocking devices and/or systems according to the prior art briefly summarized above, although appreciable from different points of view, such as ease of implementation and contained costs, have problems and/or disadvantages that the present invention aims to respectively solve and overcome.

A first problem or disadvantage relates to the fact that when the vehicle remains within the speed threshold in which the block is allowed, and with the tilting system blocked (namely, when the tilting is prevented but the vehicle still moves), the vehicle could bump into a hole or an unevenness (unfortunately, such situations are frequent because of uneven road surfaces), but also a sewer cover or in any case a difference in height, such as to cause a lateral imbalance (on the right or left respectively) of the vehicle with respect to the vertical plane while remaining in the tilting locked condition until the release speed is reached (in the case of automatic locking devices) or until the manual release of the swing lock, normally by means of a button on the handlebar (in the case of devices wherein the block can be activated or deactivated manually).

In these cases, there is a risk that at the restart, with the consequent release of the tilting, the driver is in serious difficulty because the vehicle, which is not perfectly vertical during the "recovery" phase with progressive increase in speed, tends to fall sideways; therefore, to counteract the imbalance the driver is forced to intervene on the steering with a manoeuvre that inevitably causes a change of trajectory, with the risk of collision with other vehicles.

In addition, in general terms, a further drawback relates to the fact that in the event of roughness (pit, manhole cove, ect.), facing an obstacle with a vehicle that has the tilting system locked can also cause the lateral overturning of the same with the resulting consequences for the vehicle, driver and any passenger, as well as for people or things that are nearby.

SUMMARY OF THE INVENTION

The purpose of the present invention is therefore to provide a solution to effectively and reliably overcome the problems and/or drawbacks summarized above with reference to tilting block devices and/or systems according to the prior art.

In particular, the main purpose of the present invention is not so much to provide a tilting locking and unlocking device (and therefore of the on-off type) but rather a device that allows intelligent control and handling of the tilting.

A further purpose of the present invention is therefore to provide a device or system through which it is possible to intelligently control and manage the movement of the suspension, thus guaranteeing the maintenance of the verticality of the tilting vehicle in low speed travel and in temporary stops.

In particular, among the purposes of the present invention is that of keeping the vehicle in a substantially vertical position automatically, without requiring the driver to place his feet on the ground to maintain balance, regardless of the conditions of the ground and the road surface, in particular in "Quad mode" (see the following description).

According to the present invention, it is also possible to adjust the tilting angle (inclination) of the vehicle in normal driving conditions by controlling the motion of the suspension, from low to high speeds, in this way controlling and guaranteeing stability, and therefore avoiding dangerous skids.

In particular, a further purpose of the present invention is to provide a device and/or a system which allows to:
 ensure the automatic maintenance of the verticality of three or more wheeled vehicles in the operating condition defined as the "quad mode", wherein the user normally places his feet on the ground, namely, when driving at reduced speed and in temporary parking in general (red traffic light, stop etc.);

perform and control the tilting of the above vehicles by implementing the ideal tilting angle according to temporary travel and/or use parameters.

It also falls within the scope of the present invention providing a device of the aforesaid type which is easily and quickly installable at low costs in a wide range of vehicles, without requiring substantial modifications thereof.

The present invention derives from the general consideration according to which the above summarized purposes can be effectively achieved by appropriately arranging a hydraulic (or pneumatic) circuit, wherein a motorized hydraulic pump connected to the hydraulic suspension system (or an electric compressor connected to the pneumatic suspension system), is managed by a software that processes the signals of the devices placed on the vehicle (speed sensors, inertial platform, engine rpm, etc.) and which, as a function of them, sends the fluid contained inside the suspension in one direction rather than in the other or from one cylinder to another or vice versa, also making use of one or more solenoid valves, in this way ensuring the maintenance of the verticality of the vehicle when stationary and at low speed and/or the control of the tilting angle of the vehicle during the curves, with an apparent improvement of the vehicle stability.

On the basis of the above consideration, and in order to overcome the drawbacks of the known suspension locking systems and/or to achieve the further purposes summarized above, the present invention relates to a hydro-pneumatic system for controlling the tilting of two wheels of a vehicle, mechanically connected to the chassis of said vehicle by means of a first oscillating anchor arm and a second oscillating anchor arm respectively, the system comprising at least a first cylinder and a second cylinder adapted to be interposed between said chassis and said first oscillating anchor arm and said second oscillating anchor arm respectively, wherein said first and second cylinders respectively comprise a first chamber and a second chamber, both with variable volume and defined by a first translatable piston housed in said first cylinder and a second translatable piston housed in said second cylinder respectively, said first chamber and second chamber containing a working fluid (conveniently, an incompressible liquid), wherein the transfer of said working fluid from said first chamber to said second chamber results in an increase of the volume of said second chamber while the transfer of said working fluid from said second chamber to said first chamber results in an increase in the volume of said first chamber, and wherein said system comprises first connection means which put into fluid communication said first chamber and said second chamber so that said working fluid can be transferred alternately from said first chamber to said second chamber and from said second chamber to said first chamber; wherein said system comprises an electric pump in fluid connection with said first connection means, wherein said system further comprises a control unit for the electric control of said electric pump, and wherein said control unit is suitable for receiving and processing one or more parameters and to electrically control said electric pump as a function of said one or more parameters, wherein the electric control of said electric pump as a function of said one or more parameters results in the transfer of said working fluid, by means of said electric pump, from said first chamber to said second chamber or from said second chamber to said first chamber according to said one or more parameters.

According to an embodiment, said system comprises a solenoid valve in fluid connection with said first connection means and said electric pump, wherein said solenoid valve is electrically controlled by said control unit and switchable between a closed position in which it prevents the transfer of said working fluid between said first chamber and second chamber and one or more opening positions in which the transfer of fluid between said first chamber and second chamber is allowed.

According to an embodiment, said system comprises second connection means putting in fluid communication the first chamber and the second chamber.

According to an embodiment, said system comprises a three-way valve and a circuit fluid tank connected to said three-way valve.

According to an embodiment, said system comprises interception means arranged along said second connection means and electrically controlled, said interception means being switchable between a closed position, in which said first chamber and second chamber are not put in fluid communication by said second connection means, and one or more opening positions, in which said first chamber and second chamber are put in fluid communication by said second connection means.

According to an embodiment, said system comprises accumulation means in fluid communication with said second connection means, where the transfer of said working fluid from said first chamber into said second chamber and from said second chamber into said first chamber results in the accumulation of at least part of said working fluid in said accumulation means.

According to an embodiment, said interception means are interposed between said second connection means and said accumulation means and comprise a three-way valve switchable between a first position, in which said first chamber and second chamber are not put in fluid communication and said accumulation means are not put in fluid communication with said second connection means, a second position, in which said first chamber and second chamber are put in fluid communication by said second connection means and said accumulation means are not put in fluid communication with said second connection means, and a third position, in which said first chamber and second chamber are put in fluid communication by said second connection means and said accumulation means are put in fluid communication with said second connection means.

According to an embodiment, said interception means are interposed between said second connection means and said accumulation means and comprise three on-off valves arranged in series and mutually switchable between a first configuration, in which said first chamber and second chamber are not put in fluid communication and said accumulation means are not put in fluid communication with said second connection means, a second configuration, in which said first chamber and second chamber are put in fluid communication by said second connection means and said accumulation means are not put in fluid communication with said second connection means, and a third configuration, in which said first chamber and second chamber are put in fluid communication by said second connection means and said accumulation means are put in fluid communication with said second connection means.

According to an embodiment, said accumulation means are defined by a third chamber with variable volume limited by a third translatable piston housed in a third cylinder, wherein said third cylinder comprises a fourth chamber 602 with variable volume containing compressible gas and positioned with respect to said third chamber so that the accumulation of said working fluid in said third chamber results in the expansion of said third chamber and in the compression of said gas in said fourth chamber 602 with consequent decrease in volume of said fourth chamber 602.

According to an embodiment, said system comprises auxiliary accumulation means in fluid communication with said first connection means, where the transfer of said working fluid from said first chamber into said second chamber and from said second chamber into said first chamber results in the accumulation of at least part of said working fluid in said auxiliary accumulation means.

According to an embodiment, said auxiliary accumulation means are defined by a fifth chamber and sixth chamber both with variable volume and defined by a fourth translatable piston housed in a fourth cylinder and a fifth translatable piston housed in a fifth cylinder respectively, wherein said fourth cylinder and fifth cylinder comprise a seventh chamber and an eighth chamber respectively, both of variable volume and containing compressible gas, said seventh chamber and eighth chamber being respectively positioned with respect to said fifth chamber and sixth chamber so that the accumulation of said fluid working in said fifth chamber and sixth chamber results in the expansion of said fifth chamber and sixth chamber and the compression of said gas in said seventh chamber and eighth chamber respectively with consequent decrease in volume of said seventh chamber and eighth chamber respectively.

The present invention furthermore relates to a vehicle with at least two tilting wheels mechanically anchored to the chassis of said vehicle by a first oscillating anchor arm and a second oscillating anchor arm, said vehicle being equipped with a system according to one of the embodiments summarized above, said first cylinder and second cylinder being interposed between said first oscillating arm and said chassis and said second oscillating arm and said chassis, respectively.

According to an embodiment, said vehicle comprises a plurality of sensors and/or measuring means for respectively detecting and/or measuring parameters such as running speed, inclination of said chassis, stresses acting on said first oscillating anchor arm and second oscillating anchor arm, wherein said sensors and/or measuring means are connected to said control unit and configured to communicate to said control unit the results of the respective detections and/or measurements.

According to an embodiment, said vehicle is a three-wheeled vehicle with two front tilting wheels arranged along a common transverse axis.

According to an embodiment, said vehicle is a three-wheeled vehicle with two rear tilting wheels arranged along a common transverse axis.

According to an embodiment, said vehicle is a four-wheeled vehicle with two front and/or rear tilting wheels arranged along a common transverse axis.

Further possible embodiments of the present invention are defined by the claims.

BRIEF DESCRIPTION OF THE DRAWINGS

The present invention will be clarified by the following detailed description of the embodiments represented in the drawings. However, the present invention is not limited to the embodiments described below and represented in the drawings; on the contrary, all variants of the embodiments described below and represented in the drawings, which would be obvious to those skilled in the art, fall within the scope of the present invention.

In the drawings:

FIGS. 1 to 5 show schematic views of devices or systems according to respective embodiments of the present invention.

DETAILED DESCRIPTION

Figure 1:
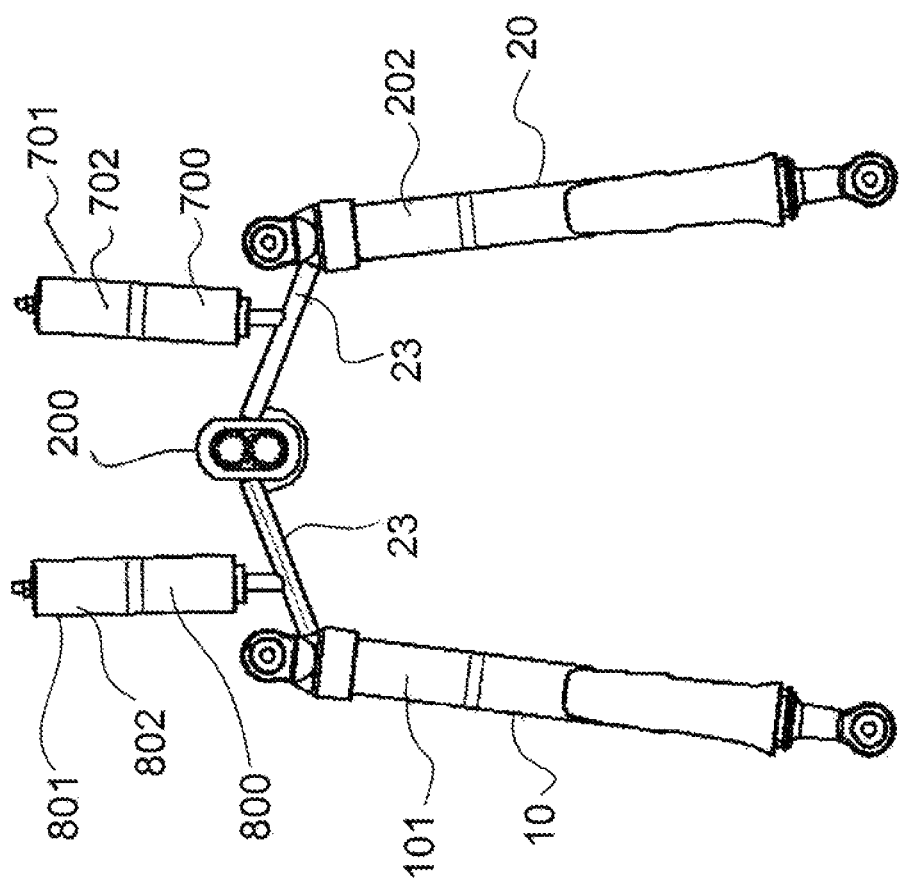

The present invention is particularly advantageous when used for managing and/or controlling the suspension of tilting motorcycles, this being the reason why the present invention will be described with particular reference to tilting motorcycles with at least two tilting wheels positioned along a common axis, for example front or rear.

However, possible applications of the present invention are not limited to motorcycles of the aforementioned type, the present invention being also applicable to four and more wheel tilting vehicles, for example quads or similar vehicles.

For example, the present invention can be suitably interfaced with a hydro pneumatic suspension which controls the tilting of vehicles with three or more wheels, such as for example a suspension of the HTS type, as described in patent EP 2 046 589 by the applicant.

In particular, the present invention can be implemented on titling vehicles designed with closed bodywork of the automotive type, with an improvement in driving comfort and safety.

The figures show two wheels R1 and R2 of a vehicle, mechanically anchored respectively to a first oscillating anchor arm B1 and a second oscillating anchor arm B2, a first cylinder 10 and a second cylinder 20 suitable for being interposed between the chassis and said first oscillating anchoring arm B1 and said second oscillating anchoring arm B2 respectively. The first 10 and second 20 cylinders comprise respectively a first chamber 101 and a second chamber 202 both with variable volume, being delimited respectively by a first translatable piston housed in the first cylinder 10 and a second translatable piston housed in the second cylinder 20 (according to substantially known methods and therefore not described in detail for synthesis reasons), said first chamber 101 and second chamber 202 containing a working fluid (conveniently, an incompressible liquid), e.g. hydraulic oil.

In particular, in the embodiment of FIG. 1, the system further comprises a first connection means or pipe 23 which puts said first chamber 101 and said second chamber 202 in fluid communication, whereby said working fluid can be alternatively transferred from said first chamber 101 to said second chamber 202 and from said second chamber 202 to said first chamber 101. Transfer of said working fluid from said first chamber 101 to said second chamber 202 results in an increase in the volume of said second chamber 202 with extension of the cylinder 20 (and in a decrease in the volume of the first chamber 101, with re-entry of the cylinder 10), while the transfer of said working fluid from said second chamber 202 to said first chamber 101 results in an increase in the volume of said first chamber 101 with extension of the cylinder 10 (and in a decrease in the volume of said second chamber 202, with re-entry of the cylinder 20).

As shown, the system of FIG. 1 further comprises an electric pump 200 in fluid communication with said pipe 23, said electric pump 200 being electrically controlled by a control unit (not shown in the drawings), wherein said control unit is configured to receive and process one or more parameters and electrically control said electric pump 200 as a function of said one or more parameters, whereby the electric control of said electric pump 200 as a function of said one or more parameters results in the transfer of said working fluid, by means of said electric pump, from said first chamber 101 to said second chamber 202 or from said second chamber 202 to said first chamber 101 according to said one or more parameters.

By way of non-limiting example, the vehicle's speed, inclination, engine rpm, etc. are among the parameters processed by the control unit. Said parameters are detected and transmitted to the control unit by sensors (not shown in the figures) arranged on the vehicle.

Finally, as shown in FIG. 1, the references 801 and 701 identify respectively a first shock absorber and a second shock absorber which respectively define, by means of a first translating piston and a second translating piston, an upper chamber 802 and a lower chamber 800 and an upper chamber 702 and a lower chamber 700. Thanks to the mobility of the pistons, all chambers 700, 702, 800 and 802 are of variable volume, whereas the lower chambers 700 and 800 are in fluid communication with the pipe 23, while the upper chambers 702 and 802 are blind and contain a compressible fluid, for example gas. The lower chambers 800 and 700 therefore constitute storage spaces for the incompressible fluid in transfer between the first and second chambers 101 and 202.

It is therefore clear from the previous description that the transfer of working fluid from the first chamber 101 to the second chamber 202 results in the extension of the cylinder 20 and in an at least partial accumulation of the liquid in the lower chamber 700, with expansion of the lower chamber 700 and compression of said gas in chamber upper 702 and consequent decrease in the volume of the upper chamber 702; in the same way, the transfer of working fluid from the second chamber 202 to the first chamber 101 results in the extension of the cylinder 10 and in an at least partial accumulation of the liquid in the lower chamber 800, with expansion of the lower chamber 800 and compression of said gas in the upper chamber 802 and consequent decrease in volume of said upper chamber 802.

Figure 2:
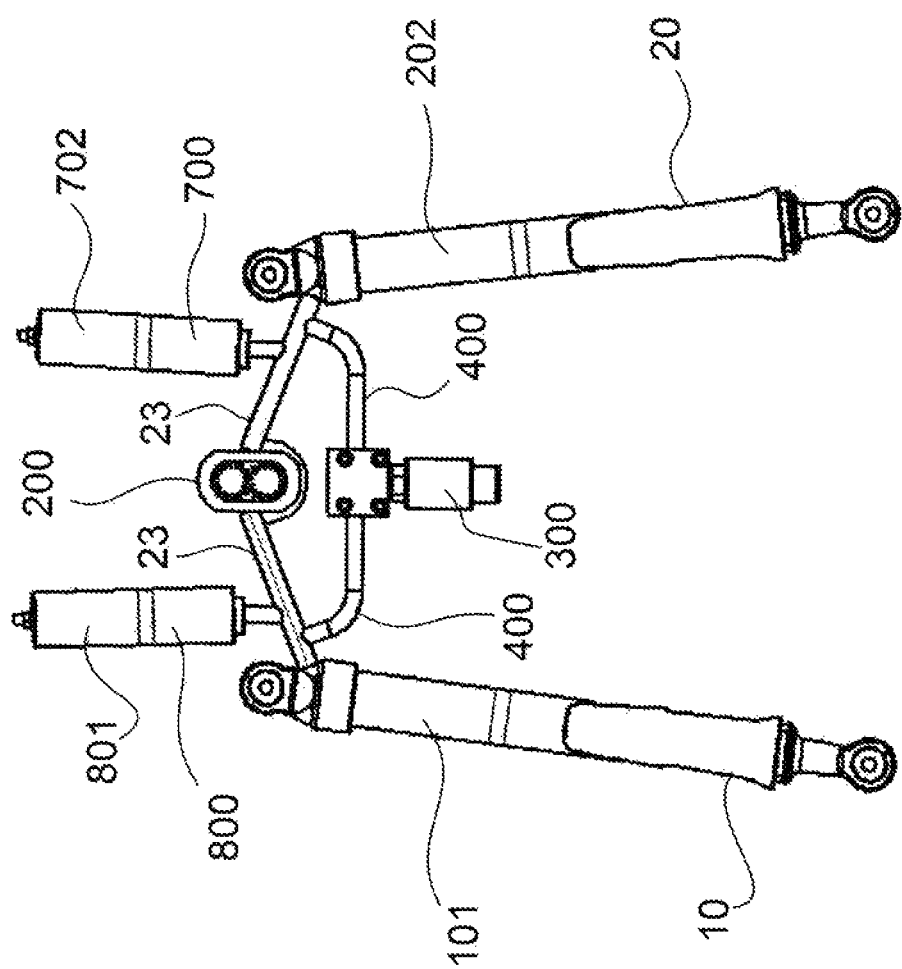

The embodiment of FIG. 2 (in which parts previously described with reference to FIG. 1 are identified by the same reference numbers) differs from that of FIG. 1 substantially in that the pipe 23 is divided into two branches, wherein a main branch 23 connects the accumulation chambers 700 and 800 and the first and second chambers 101, 202, according to the methods described above, while along a second connection means or bypass branch 400 there is a solenoid valve 300 suitable for being switched so as to partially or totally close the bypass branch 400; in this way, the effectiveness of controlling the position of the suspension (in practice, of cylinders 10 and 20) is improved. In fact, said solenoid valve 300 is electrically controlled by the control unit and is switchable between a closed position in which it prevents the transfer of said working fluid between the first and second chambers 101, 202 and one or more open positions in which fluid transfer between said first and second chambers 101, 202 is allowed.

With this embodiment, the vehicle can also be driven with the device deactivated thanks to the first shock absorber and second shock absorber 701 and 801 connected respectively to cylinders 20 and 10 so as to satisfy the springing condition combined with the action of controlling the suspension implemented by the motorized pump 200.

In fact, the solenoid valve 300 partially or totally closes the communication of the bypass branch 400 so as to make the action of controlling the position of the suspension effective, driving the vehicle without assistance from the motorized pump 200 being possible when the solenoid valve 300 is open.

Figure 2A:
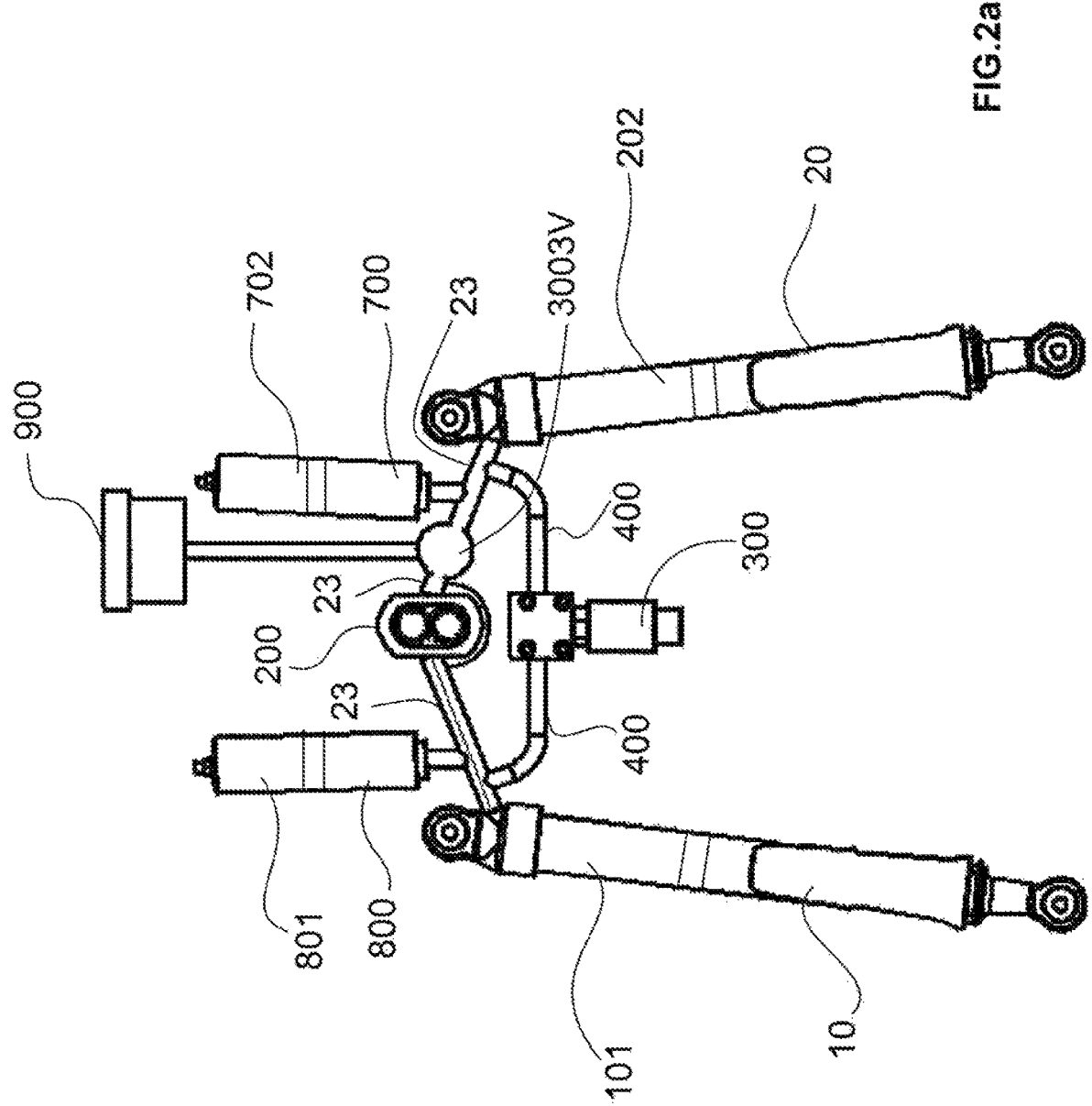

In the embodiment of FIG. 2*a*, a three-way valve 3003V operated by the control unit is arranged along the right branch (with respect to the figure) of the pipe 23, in particular between the pump 200 and the second chamber 202. Furthermore, in connection with the three-way valve 3003V there is a reservoir 900 for the circuit fluid.

According to this embodiment, with the three-way valve 3003V open towards the pump 200 and towards the reservoir 900 (respectively interrupting the communication of the main branch 23) it is possible to withdraw fluid from the circuit (in substantially equal parts from the first and second chambers 101, 202) and accumulate the fluid withdrawn from the circuit in the reservoir 900, and respectively subtract fluid from the reservoir 900 and introduce it into the circuit (depending on the direction of rotation of the pump 200).

The withdrawal of fluid from the circuit results in the decrease in volume of both the first and second chambers 101, 202, and therefore in the return of both cylinders 10 and 20, and in the lowering of the entire suspension.

On the contrary, the withdrawal of fluid from the reservoir results in the increase in volume of both the first and second chambers 101, 202, and therefore in the extension of both cylinders 10 and 20, and therefore in the raising of the entire suspension. When there is no need to change the attitude (letting in or withdrawing oil), the 3003V valve connects the main branch 23 by excluding the connection with the reservoir 900.

In the embodiment of FIG. 3 (in which component parts previously described with reference to other figures are identified by the same reference numbers), the solenoid valve 300 is positioned along the main branch of the pipe 23, interposed between the electric pump 200 and a branch of the pipe 23. Furthermore, along the bypass branch 400 there is a three-way valve 500, which is also put in fluid communication with a further accumulation or spring cylinder 601 which, by means of a translatable piston housed inside it, defines an accumulation or spring chamber (upper) with variable volume 600 for the accumulation of the working fluid that flows along the bypass branch 400, and a blind (lower) chamber with variable volume containing gas.

The three-way valve 500 is switchable between a first position, in which said first and second chambers 101, 202 are not put in fluid communication and said accumulation chamber 600 is not in fluid communication with said bypass branch 400, a second position, in which said first and second chambers 101, 202 are put in fluid communication through said bypass branch 400 and said accumulation chamber 600 is not in fluid communication with said bypass branch 400, and a third position, in which said first and second chambers 101, 202 are put in fluid communication through said bypass branch 400 and said accumulation chamber 600 is in fluid communication with said bypass branch 400.

With this embodiment, the vehicle can also be driven with the device being deactivated and in addition the blockage of the flow for prolonged parking is carried out by the 3-way valve 500 centrally placed above the accumulation chamber 600.

This embodiment is advantageous when it is desired to have a limited size in the area of the heads of the hydraulic cylinders 10 and 20, the peculiarity of this configuration consisting in the possibility of using smaller motorized pumps since the closure of the bypass branch 400 allows the pump 200 to be more effective.

The solenoid valve 300 adjacent to the motorized pump 200 is of the normally closed type so that at rest it can close the passage of fluid between the cylinders 10 and 20, the flow being mechanically regulated by the 3-way valve 500 which is closed when the vehicle is to be parked for a long time.

The solenoid valve 300, in this connection mode, is only opened during "Quad mode" driving, with a logic managed by the control unit.

The 3-way valve 500 for blocking the flow for prolonged parking can be controlled by a servo motor according to the logic management of the control unit, therefore it can be partially closed, closed and then open, held in an intermediate position between open and closed in order to make the verticalizing and shock-absorbing action more effective.

Figure 4:
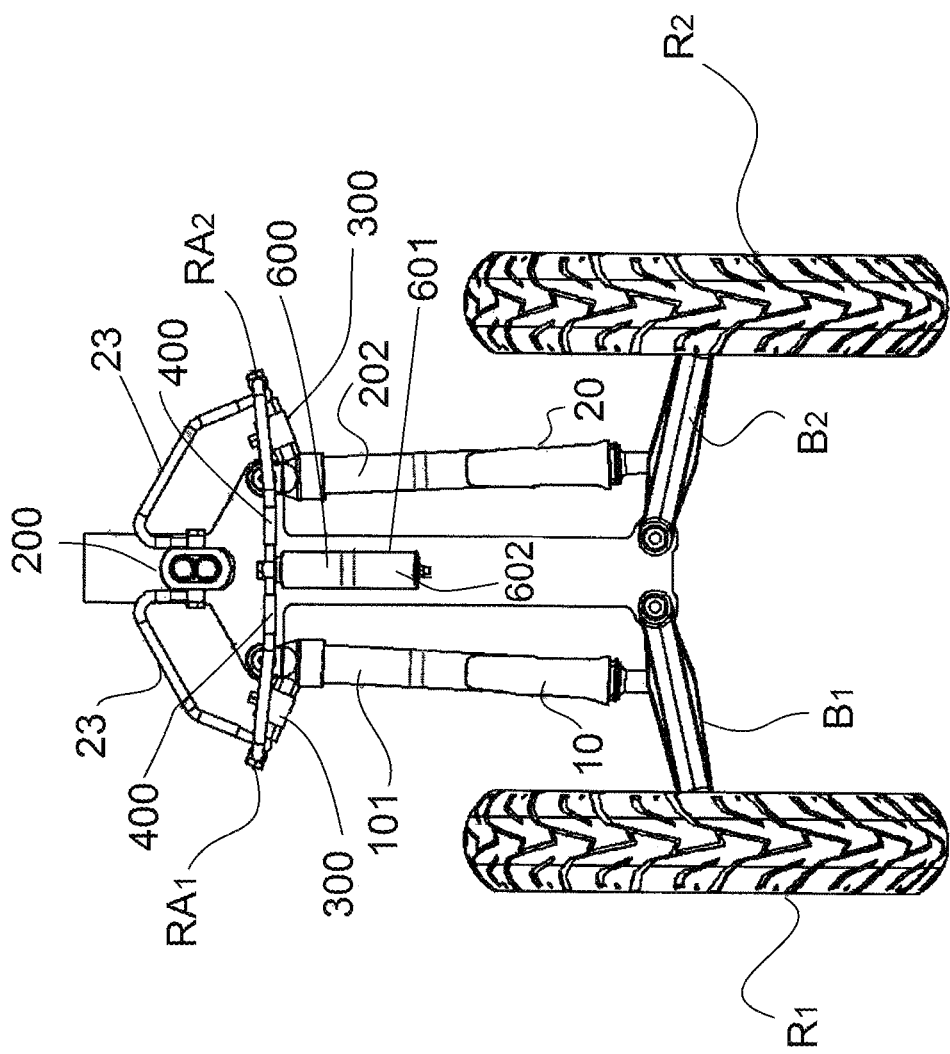

The embodiment of FIG. 4 differs from that of FIG. 3 in that in the embodiment of FIG. 4 there are two valves 300, one interposed between the cylinder 10 and the fitting RA1 between the by-pass branch 400 and the main branch 23 of the connecting pipe, and the other between the cylinder 20 and the fitting RA2 between the by-pass branch 400 and the main branch 23 of the connecting pipe.

With this embodiment, the vehicle can also be driven with the device being deactivated.

In fact, as can be seen from FIG. 4, the two valves 300 stop oil flow between the first and second chambers 101, 202 in order to guarantee the blocking of the system for prolonged parking. The control unit processes all the signals coming from the various sensors located on the vehicle and transmits to the motorized pump 200 the command to pump the fluid in one direction rather than the other or not to activate itself.

The pipe 23 and the bypass branch 400 are also suitably calibrated so as to make the operation effective in particular when the motorized pump 200 creates a pressure in the pipe branch corresponding to the delivery branch, the delivery branch is connected to the respective cylinders 10 and 20 which undergoes the oil flow and consequently extends, the same cylinder being connected to the central spring system (the first shock absorber and second shock absorber 701 and 801 of FIG. 1).

In this way, two conditions are met:

The first one is that the pressure generated by the motorized pump 200 is such as to impart to the cylinder which is connected to the delivery branch sufficient force to verticalize the vehicle (the lower mobile part of the cylinder being anchored to the wheel suspension unit) and thus determines the position thereof with respect to the vehicle, the upper part of the cylinder being connected to the vehicle chassis.

The second one is that springing of the suspension and consequently springing of the vehicle also in Quad mode are guaranteed. In fact, the bypass branch connecting the accumulation chamber 600 to the cylinders 10 and 20 remains open even when the motorized pump 200 is operating, keeping the cylinders 10 and 20 in communication with the accumulation cylinder 601, thus ensuring springing of the suspension also in "Quad mode", i.e. when the motorized pump 200 sends oil to the right branch rather than the left branch in order to keep the vehicle in balance. Appropriate calibration of the pipe 23 connecting the motorized pump 200 to the cylinders 10 and 20 and of the bypass branch 400 make the Quad mode operation of the suspension soft and effective.

Figure 4A:
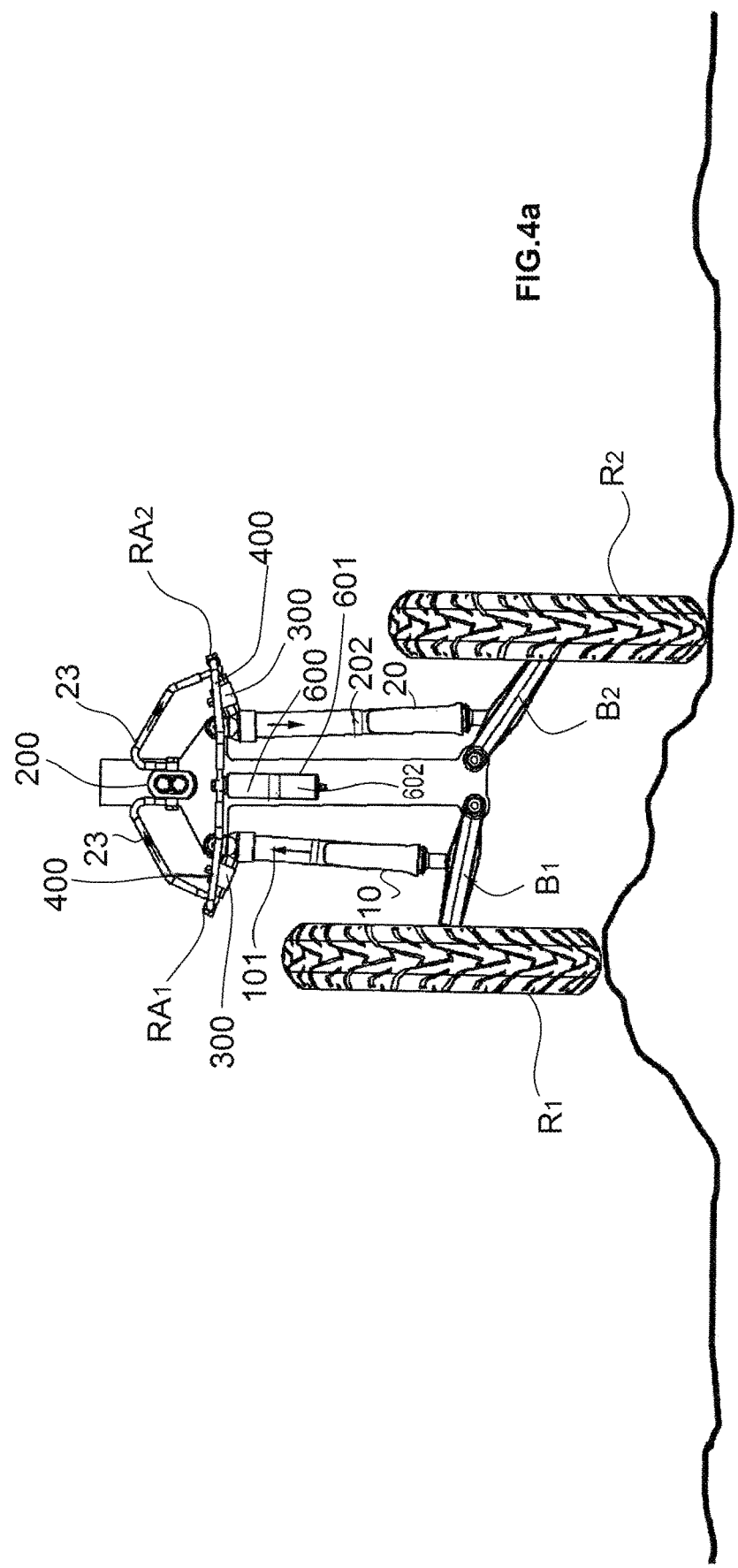

Further advantages of the embodiment of FIG. 4 are highlighted in FIG. 4a.

FIG. 4a represents in fact a "Quad mode" condition in which the vehicle is kept in a vertical position thanks to the intervention of the motorized pump 200 controlled by the control unit. Specifically, when the vehicle encounters a condition of uneven ground, the motorized pump 200 moves the liquid contained in the suspension from one cylinder to another (from 10 to 20 in the case shown) and consequently the vehicle position of the wheels R1 and/or R2, that adapt to the conditions of the road surface, varies.

Figure 5:
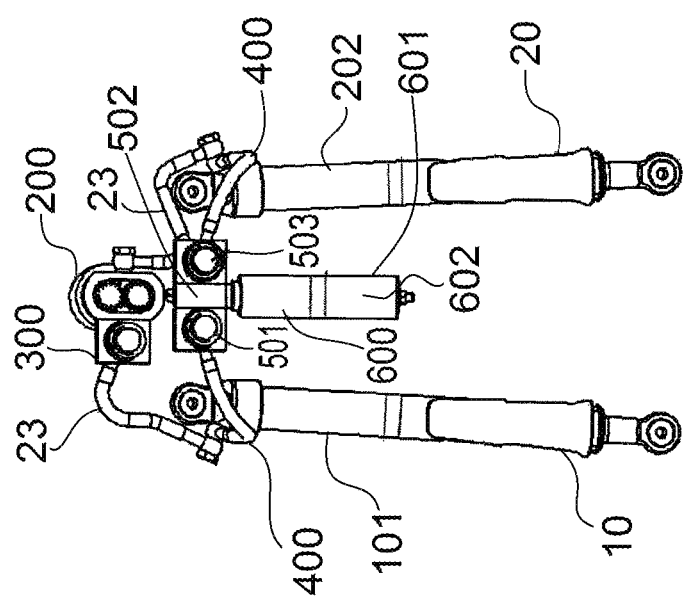

The embodiment of FIG. 5 differs from that of FIGS. 3 and 4 in that, in the embodiment of FIG. 5, the 3-way valve 500 of FIG. 3, and the valves 300 of FIG. 4 are replaced by three valves 501, 502 and 503 arranged in series along the bypass branch 400, the central valve 502 being placed in correspondence with the accumulation chamber 600 of the accumulation cylinder 601. The valve 300 is instead arranged along the main branch 23 adjacent to the pump 200, wherein the valve 300 is used in ways corresponding to those described with reference to other figures, for example with reference to FIG. 3.

The three on-off valves 501, 502, 503 are arranged in series and are mutually switchable between a first configuration, in which the first and second chambers 101, 202 are not put in fluid communication and the accumulation chamber 600 is not put in fluid communication with the bypass branch 400, a second configuration, in which said the first and second chambers 101, 202 are put in fluid communication through the bypass branch 400 and the accumulation chamber 600 is not put in fluid communication with the bypass branch 400, and a third configuration, in which said the first and second chambers 101, 202 are put in fluid communication through the bypass branch 400 and said accumulation chamber 600 is put in fluid communication with the bypass branch 400.

With this embodiment, the vehicle can also be driven with the device deactivated.

In this configuration, in fact, the solenoid valves 501, 502 and 503, controlled by the control unit, allow appropriate adjustment of the oil flow that the motorized pump 200 creates within the hydraulic circuit, the solenoid valves being of the on-off type or progressive.

Also in this case there is the possibility of using smaller motorized pumps since the closure of the bypass branch 400 allows the pump 200 to be more effective.

The springing effect of the system, in this case, is completely controlled by the control unit which regulates the communication between the first and second chambers 101, 202 of the cylinders 10 and 20 respectively and the accumulation chamber 600 of the accumulation cylinder 601 according to the logic of the control unit. Partial or total opening of the solenoid valves 501, 502 and 503 is adjusted according to the priority requirement: springing rather than verticalization and vice versa.

The opening, closing or partial closing of the solenoid valves are managed separately by the control unit in order to have the possibility of connecting one branch, both branches or no branch of the suspension to the central accumulation cylinder 601.

For prolonged parking, the valve 502 is set at the accumulation chamber 600.

It has therefore been demonstrated that the present invention overcomes the drawbacks of the prior art.

In particular, through the present invention a solution is made available which allows intelligent management of the suspension of a vehicle, in particular of a tilting vehicle. The present invention provides intelligent management of both the verticalization and the springing functions of the vehicle.

In particular, the present invention allows the vehicle to be automatically kept in a substantially vertical position, without requiring the driver to place his feet on the ground to maintain balance, regardless of the conditions of the ground and road surface, in particular in "Quad mode" (see the above description).

By means of the system according to the present invention, by controlling the motion of the suspension it is also possible to adjust the tilting angle (inclination) of the vehicle in normal driving conditions, from low to high speeds, in this way controlling and guaranteeing stability, and therefore avoiding dangerous skids.

In particular, through the present invention a device and/or a system is made available which allows:

ensuring the automatic maintenance of the verticality of three or more wheeled vehicles in the condition of use defined as the "quad mode", wherein the user normally uses his feet on the ground, that is, when driving at reduced speed and in temporary parking in general (red traffic light, stop etc.);

performing and controlling the tilting of the above vehicles by implementing the ideal tilting angle according to travel and/or use parameters.

Furthermore, the device or system according to the present invention, being manufacturable and installable by simple, fast operations, at low costs, may be implemented in a wide range of vehicles without requiring substantial modifications thereof.

It is to be understood that the present invention is not limited to the embodiments described above and represented in the drawings. All modifications and/or constructional variations of the embodiments described above and represented in the drawing, which will be apparent to those skilled in the art, fall within the scope of the present invention as described and claimed herein.

What is claimed is:

1. A system for controlling tilting of two wheels of a vehicle, mechanically anchored to a chassis of said vehicle by a first oscillating anchor arm and a second oscillating anchor arm respectively, the system comprising at least a first cylinder and a second cylinder suitable for being interposed between said chassis and said first oscillating anchor arm and said second oscillating anchor arm respectively, wherein said first and second cylinders comprise respectively a first chamber and a second chamber both with variable volume and containing a working fluid, wherein transfer of said working fluid from said first chamber to said second chamber results in an increase in the volume of said second chamber while transfer of said working fluid from said second chamber to said first chamber results in an increase in the volume of said first chamber, and wherein said system further comprises first connection means which connect said first chamber and said second chamber so that said working fluid is alternately transferable from said first chamber to said second chamber and from said second chamber to said first chamber; said system further comprising an electric pump in fluid communication with said first connection means, and a control unit for electrically controlling said electric pump, said control unit being configured to receive and process one or more parameters and electrically control said electric pump as a function of said one or more parameters, wherein electric control of said electric pump as a function of said one or more parameters results in the transfer of said working fluid, by said electric pump, from said first chamber to said second chamber or from said second chamber to said first chamber as a function of said one or more parameters, and wherein said system further comprises auxiliary accumulation means in fluid communication with said first connection means, and wherein transfer of said working fluid from said first chamber into said second chamber and from said second chamber into said first chamber results in accumulation of at least part of said working fluid in said auxiliary accumulation means.

2. The system of claim 1, wherein said system further comprises a solenoid valve in fluid communication with said first connection means and said electric pump, said solenoid valve being electrically controlled by said control unit and switchable between a closed position, in which said solenoid valve prevents transfer of said working fluid between said first chamber and second chamber, and one or more open positions, in which transfer of said working fluid between said first chamber and second chamber is allowed.

3. The system of claim 1, said system further comprising second connection means putting in fluid communication said first chamber and said second chamber.

4. The system of claim 3, said system further comprising interception means arranged along said second connection means, wherein said interception means are switchable between a closed position, in which said first chamber and second chamber are not in fluid communication through said second connection means, and one or more open positions, in which said first chamber and second chamber are in fluid communication through said second connection means.

5. The system of claim 4, said system further comprising accumulation means in fluid communication with said second connection means, wherein transfer of said working fluid from said first chamber into said second chamber and from said second chamber into said first chamber results in an accumulation of at least part of said working fluid in said accumulation means.

6. The system of claim 5, wherein said interception means are placed between said second connection means and said accumulation means, and wherein said interception means comprise a three-way valve switchable between a first position, in which said first chamber and second chamber are not in fluid communication and said accumulation means are not in fluid communication with said second connection means, and a second position, in which said first chamber and second chamber are in fluid communication through said second connection means and said accumulation means are in fluid communication with said second connection means.

7. The system of claim 5, wherein said interception means are interposed between said second connection means and said accumulation means, and wherein said interception means comprise three on-off valves arranged in series and reciprocally switchable between a first configuration, in which said first chamber and second chamber are not in fluid communication and said accumulation means are not in fluid communication with said second connection means, and a second configuration, in which said first chamber and second chamber are in fluid communication through said second connection means and said accumulation means are in fluid communication with said second connection means.

8. The system of claim 5, wherein said accumulation means are defined by a third chamber with variable volume of an accumulation cylinder, and wherein said accumulation cylinder comprises a fourth chamber with variable volume containing compressible gas and positioned with respect to said third chamber so that the accumulation of said working fluid in said third chamber results in an expansion of said third chamber and in a compression of said compressible gas in said fourth chamber with consequent decrease of volume of said fourth chamber.

9. The system of claim 1, wherein said auxiliary accumulation means are defined by a fifth chamber and a sixth chamber both of variable volume and belonging to a fourth cylinder and a fifth cylinder respectively, and wherein said fourth cylinder and fifth cylinder comprise a seventh chamber and an eighth chamber respectively, both of variable volume and containing compressible gas, said seventh chamber and eighth chamber being positioned with respect to said fifth chamber and sixth chamber respectively in such a way that the accumulation of said working fluid in said fifth chamber and sixth chamber results in expansion of said fifth chamber and sixth chamber and in compression of said compressible gas in said seventh chamber and eighth chamber respectively, with a consequent decrease in volume of said seventh chamber and eighth chamber.

10. A vehicle comprising at least two tilting wheels mechanically anchored to a chassis of said vehicle by a first oscillating anchor arm and a second oscillating anchor arm respectively, said vehicle comprising a system for controlling tilting of two wheels mechanically anchored to the chassis, the system comprising at least a first cylinder and a second cylinder suitable for being interposed between said chassis and said first oscillating anchor arm and said second oscillating anchor arm respectively, wherein said first and second cylinders comprise respectively a first chamber and a second chamber both with variable volume and containing a working fluid, wherein transfer of said working fluid from said first chamber to said second chamber results in an increase in the volume of said second chamber while transfer of said working fluid from said second chamber to said first chamber results in an increase in the volume of said first chamber, and wherein said system further comprises first connection means which connect said first chamber and said second chamber so that said working fluid is alternately transferable from said first chamber to said second chamber and from said second chamber to said first chamber; said system further comprising an electric pump in fluid communication with said first connection means, and a control unit for electrically controlling said electric pump, said control unit being configured to receive and process one or more parameters and electrically control said electric pump as a function of said one or more parameters, wherein electric control of said electric pump as a function of said one or more parameters results in the transfer of said working fluid, by said electric pump, from said first chamber to said second chamber or from said second chamber to said first chamber as a function of said one or more parameters, said first cylinder and second cylinder being interposed between said first oscillating anchor arm and said chassis and said second oscillating anchor arm and said chassis respectively, and wherein said system further comprises auxiliary accumulation means in fluid communication with said first connection means, and wherein transfer of said working fluid from said first chamber into said second chamber and from said second chamber into said first chamber results in accumulation of at least part of said working fluid in said auxiliary accumulation means.

11. The vehicle of claim 10, the vehicle further comprising a plurality of sensors and/or measurement means for respectively detecting and/or measuring parameters comprising running speed, inclination of said chassis, and stresses acting on said first oscillating anchor arm and second oscillating anchor arm, wherein said sensors and/or measurement means are connected to said control unit and configured to communicate to said control unit results of respective detections and/or measurements.

12. The vehicle of claim 10, wherein said vehicle is a three-wheeled vehicle with two front wheels tilting along a common transverse axis.

13. The vehicle of claim 10, wherein said vehicle is a three-wheeled vehicle with two tilting rear wheels arranged along a common transverse axis.

14. The vehicle of claim 10, wherein said vehicle is a four-wheeled vehicle with two tilting front and/or rear wheels arranged along a common transverse axis.

* * * * *